United States Patent
Duerr et al.

(10) Patent No.: US 6,793,281 B2
(45) Date of Patent: Sep. 21, 2004

(54) FOLDING-TABLE ARRANGEMENT FOR VEHICLES

(75) Inventors: Bernhard Duerr, Calw-Stammheim (DE); Frank Emhardt, Stuttgart (DE); Hermann Gaus, Stuttgart (DE); Thomas Geisel, Rottenburg (DE); Rainer Leucht, Baltmannsweiler (DE); Ralf-Henning Schrom, Rottenburg (DE); Rainer Tiefenbacher, Steinenbronn (DE)

(73) Assignee: DaimlerChrysler AG, Stuttgart (DE)

( * ) Notice: Subject to any disclaimer, the term of this patent is extended or adjusted under 35 U.S.C. 154(b) by 83 days.

(21) Appl. No.: 09/866,483

(22) Filed: May 29, 2001

(65) Prior Publication Data

US 2002/0003361 A1 Jan. 10, 2002

(30) Foreign Application Priority Data

May 27, 2000 (DE) .......................................... 100 26 561

(51) Int. Cl.$^7$ .............................................. A47B 39/00
(52) U.S. Cl. ...................................... 297/147; 297/173
(58) Field of Search ................................ 297/135, 144, 297/147, 173, 174 R, 115, 154

(56) References Cited

U.S. PATENT DOCUMENTS 4,958,576 A    9/1990  Kauer
5,035,464 A *  7/1991  Spallholtz
5,927,799 A *  7/1999  Tornero

FOREIGN PATENT DOCUMENTS

| DE | 33239865 | 3/1985 |
| DE | 19705754 | 8/1998 |
| DE | 19822694 | 11/1999 |
| EP | 0350897 | 9/1990 |
| JP | 09118166 | 5/1997 |

* cited by examiner

Primary Examiner—Milton Nelson, Jr.
(74) Attorney, Agent, or Firm—Crowell & Moring LLP

(57) ABSTRACT

A folding-table arrangement is assigned to a vehicle seat and has tabletop arrangement with at least one tabletop being accommodated in a receiving housing which is arranged laterally next to the vehicle seat. Each tabletop of the tabletop arrangement can be pulled out upwards and folded down into an approximately horizontal in-use position in which the tabletop arrangement is held by the receiving housing by a support. The tabletop arrangement together with its hinge pin which connects it to the receiving housing is guided in a sliding manner between its pulled-out and its pushed-in position in a guide shaft of the receiving housing. The concomitantly moved hinge pin of the tabletop arrangement is fixed on a guide slide which runs in the guide shaft of the receiving housing and, in the in-use position of the tabletop arrangement, is displaced into an upper end position in the guide shaft.

20 Claims, 5 Drawing Sheets

FOLDING-TABLE ARRANGEMENT FOR VEHICLES

BACKGROUND AND SUMMARY OF THE INVENTION

This application claims the priority of German Patent Document 100 26 561.8, filed in Germany, May 27, 2000, the disclosure of which is expressly incorporated by reference herein.

The invention relates to a folding-table arrangement for vehicles, in particular for motor vehicles. Preferred embodiments of the invention relate to a folding-table arrangement for motor vehicles, which arrangement is assigned to a vehicle seat, with a tabletop arrangement comprising at least one tabletop being accommodated in a receiving housing which is arranged laterally next to the vehicle seat and from which each tabletop of the tabletop arrangement can be pulled out upwards and folded down into an approximately horizontal in-use position in which the tabletop arrangement is held by the receiving housing by a support, in which case the tabletop arrangement together with the hinge pin axle which connects it to the receiving housing is guided in a sliding manner between its pulled-out and its pushed-in position in a guide shaft of the receiving housing.

European Patent Document EP 0 350 897 A2 (corresponding U.S. Pat. No. 4,958,576) has already disclosed a folding-table arrangement in which two tabletops can be pulled out upwards from a receiving housing, which is arranged laterally next to the vehicle seat, and can be folded downwards into a horizontal in-use position. For the sliding guidance of the tabletops in the receiving housing, a hinge pin of a hinge band connecting the tabletops to each other is provided, which hinge pin is lowered together with the tabletops and whose ends which protrude with respect to the hinge band engage in guide strips arranged on the vertical narrow sides of the receiving housing.

In their in-use position, the two tabletops rest with their wide side on the associated narrow side of the receiving housing and are supported via the hinge pin. As a counter-holder for supporting the protruding ends of the hinge pin in their position above the receiving housing, the guide strips project out of the receiving housing and are closed at their upper end by a dome-shaped covering.

The raised coverings of the guide strips clearly protrude over the tabletops in their in-use position and can undesirably restrict the freedom of movement of the user. In addition, in the case of accidents the raised coverings may increase the risk of injury for the occupants of the vehicle.

An object of the invention is therefore to develop a folding-table arrangement of the generic type which makes possible more comfortable use and an improvement in the security against injury in the case of accidents.

The invention achieves this object by providing a folding-table arrangement for motor vehicles, which arrangement is assigned to a vehicle seat, with a tabletop arrangement comprising at least one tabletop being accommodated in a receiving housing which is arranged laterally next to the vehicle seat and from which each tabletop of the tabletop arrangement can be pulled out upwards and folded down into an approximately horizontal in-use position in which the tabletop arrangement is held by the receiving housing by a support, in which case the tabletop arrangement together with the hinge pin axle connects it to the receiving housing is guided in a sliding manner between its pulled-out and its pushed-in position in a guide shaft of the receiving housing, wherein the hinge pin axle of the tabletop arrangement is fixed on a guide slide which is guidably movable in a guide shaft of the receiving housing and, in an in-use position of the tabletop arrangement, is displaced into an upper end position in the guide shaft.

Advantageous refinements of the invention can be gathered from the following description and the claims.

In the case of the folding-table arrangement, which can be used in aircraft, watercraft or land vehicles, a stop has merely to be provided for the upper end position of the guide slide of the tabletop arrangement, which stop is arranged within the receiving housing and therefore does not protrude in a raised manner from the receiving housing. In addition, the hinge pin does not have to have any end regions which protrude laterally from the tabletop arrangement, which means that the width of engagement of the tabletop arrangement, and therefore also the clear width of the receiving shaft, can be reduced.

According to a particularly preferred embodiment, the hinge pin is formed by two spaced-apart hinges. This produces significant advantages in terms of weight with sufficient stability, as compared with a continuous hinge band, and the outlay on installation can be reduced.

In order to be able to bring the tabletop arrangement into an in-use position, lying centrally in front of the assigned seat, without an undesirable increase in size of the tabletop formats, there is provided as the lateral extension arm a supporting plate on which the tabletop arrangement is mounted in a manner enabling it to be displaced by the user for individual positioning.

In order to make possible a particularly exact adaptation of the tabletop position to the user's requirements, the tabletop arrangement can be mounted in a manner enabling it to be displaced in an infinitely variable manner in the longitudinal direction of the supporting plate and transversely thereto. An ergonomically favorable position of the tabletop arrangement can thereby be set individually for each user, since virtually any point in the plane can be "approached".

In order to be able to design the receiving housing such that it is compact despite a sufficient tabletop format of the tabletop arrangement, a two-part tabletop is advantageously provided for the tabletop arrangement assigned to a seat. Each of the partial tabletops can therefore be matched to the width of the receiving housing. The tabletop parts are connected along the long narrow sides, for example via hinges, so that one of the two partial tabletops can be folded onto the other one in a space-saving manner prior to the tabletop arrangement being slid into the guide shaft.

In addition to the horizontal setting option of the tabletop arrangement, the latter can additionally be set in inclination, for example for writing activities or the like.

The setting of the inclination of the tabletop arrangement can be made possible in a technically simple manner by means of a segment-like holding plate which is mounted pivotably on the guide slide.

In order for there to be clearance above the receiving shaft for the setting of the inclination of the holding plate, the upper end region of the receiving housing can be bevelled corresponding to the maximum inclination of the holding plate. Therefore, additional constructional space is not required in the receiving housing for the setting of the inclination.

A technically particularly simple fixing of the tabletop arrangement in its horizontal in-use position can be realized by means of a holding bracket made of bent wire.

For a space-saving accommodation of the folding table when not in use, the receiving housing together with the folding table accommodated beneath it can be folded down into a lowered storage position.

By coordinating a pivot axis, which runs transversely to the wide side of the receiving housing, with the seat position and by means of the dimensions of the receiving housing, when the receiving housing is folded downwards the upwardly facing narrow side can lie in a position in which it can be used as an arm support.

If this is desirable, the corresponding narrow side of the receiving housing can be upholstered in a similar manner to an armrest of a seat.

For a further, individual setting of the folding-table arrangement, in particular in combination with the possibility of setting the inclination of the tabletop arrangement, it is possible, in the in-use position, for a plurality of pivoting positions of the receiving housing to be set fixedly in a limited setting region. The initial position of the tabletop arrangement can therefore be set away from the user or close to the user.

Further details and advantageous refinements of the invention are explained in greater detail below with reference to the drawing.

Other objects, advantages and novel features of the present invention will become apparent from the following detailed description of the invention when considered in conjunction with the accompanying drawings.

DETAILED DESCRIPTION OF THE DRAWINGS

Figure 1:
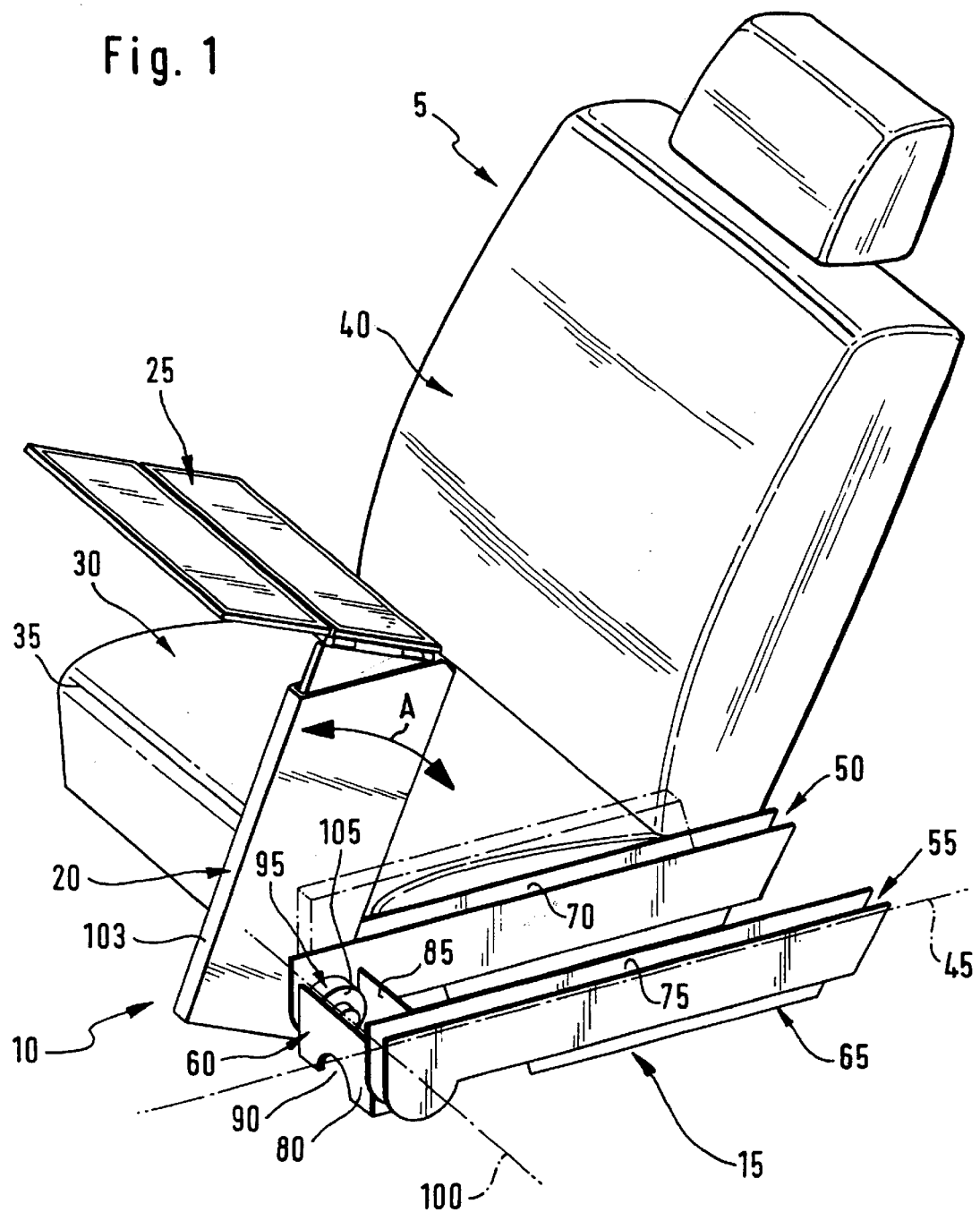
FIG. 1 shows a general illustration of a folding-table arrangement next to a vehicle seat constructed according to a preferred embodiment of the present invention and shown in an in-use position, in a perspective oblique view from the side.

FIG. 1 illustrates a right-hand rear seat 5 of a motor vehicle (not illustrated) having a folding-table arrangement 10. The folding-table arrangement 10 which is assigned to the rear seat 5 comprises as main components a supporting frame 15, a receiving housing 20 and a tabletop arrangement 25.

The rear seat 5 is a motor-vehicle seat which points in the direction of travel and has a seat cushion 30 with a front seat edge 35 and a seat back 40.

The supporting frame 15 supports the receiving housing 20 and is constructed mirror-symmetrically with respect to the central axis 45 of the vehicle, with the result that it can hold the corresponding receiving housing for two folding-table arrangements for the right-hand rear seat and also for the left-hand rear seat (not illustrated). For this purpose, the supporting frame 15 has two cases 50 and 55 which are arranged spaced-apart laterally approximately parallel to each other and are connected to each other via a web 60 and a base 65.

The cases 50 and 55 end approximately below the seat cushion 30 with their narrow longitudinal sides 70 and 75 and extend in their length approximately over the entire length of the seat cushion.

The web 60 comprises two plates 80 and 85 which are arranged parallel to each other and have a corresponding cut-out 90 for supporting them on the central tunnel.

A pivot axis 100 which is approximately parallel to the front seat edge 35 runs between the two plates 80 and 85 in order to pivot the receiving housing 20 from the erected in-use position (illustrated by solid lines) into an approximately horizontally lowered storage position (indicated by dash-dotted lines) and vice versa in accordance with the arrow A. In its storage position, the upwardly facing narrow side 103 of the receiving housing 20 can be used as an arm support.

The geometrical pivot axis 100 passes through an articulation point 95 of the case 50, which point is equipped with a latching device 105. The latching device 105 interacts with an axle shaft, which is connected in a rotationally fixed manner to the receiving housing 20, with the result that a plurality of pivoting positions in a defined setting region can be fixed for the receiving housing 20.

In the left-hand rear seat, an articulation point is provided in the same manner for its receiving housing which does not have to be described in further detail because of the mirror symmetry.

Figure 2:
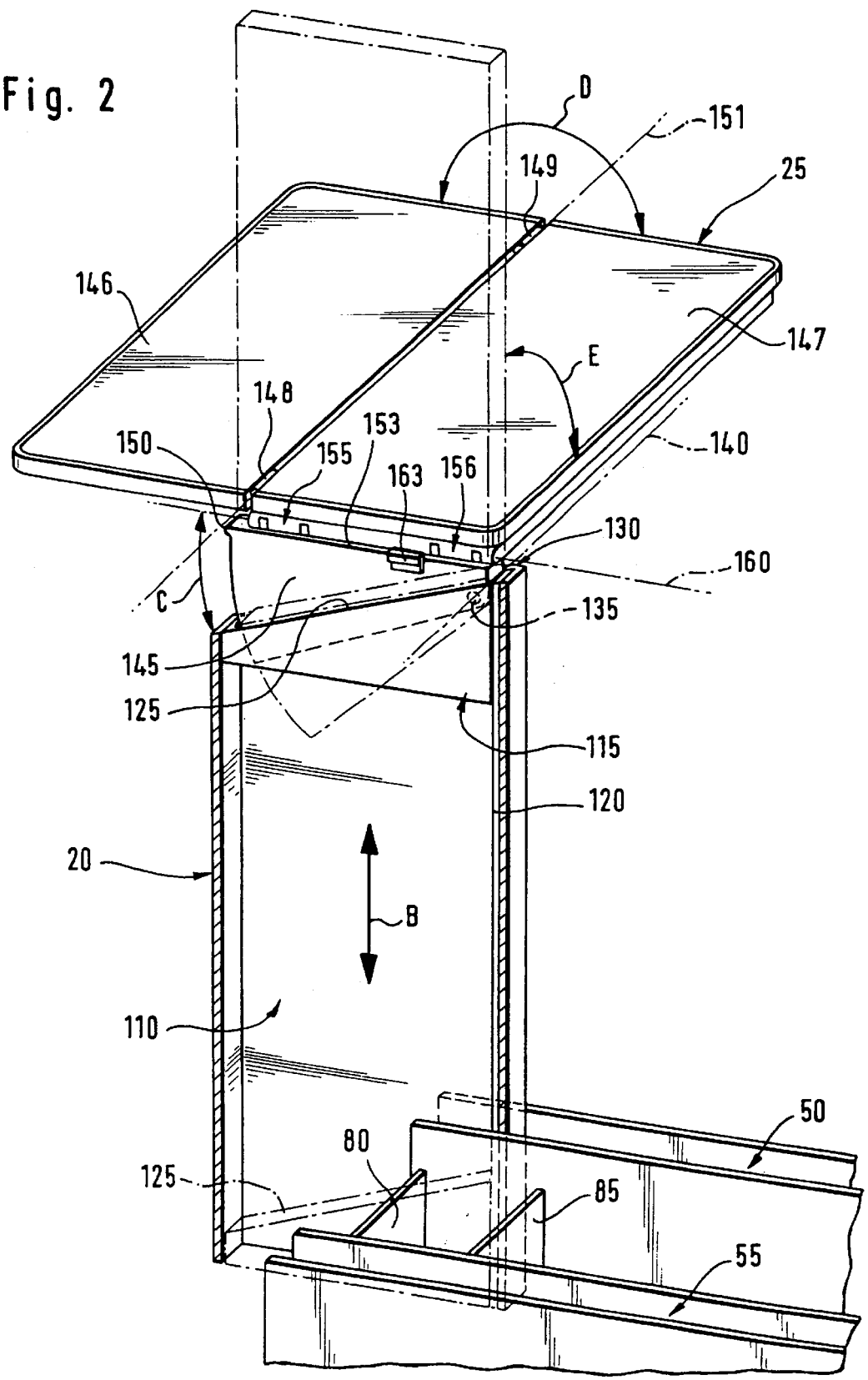
FIG. 2 shows the separate folding-table arrangement according to FIG. 1 with the receiving housing broken open.

According to the broken-open illustration in FIG. 2, the receiving housing 20 has a guide shaft 110 which is formed by the inner contour of rectangular cross section. Accordingly, the guide shaft 110 has arranged in it a guide slide 115, which is matched to the hollow cross section of the said shaft, the said slide being arranged such that it can move up and down in the arrow direction B between the upper end position (illustrated by solid lines) and the lower end position (indicated by dash-dotted lines). The upper end position is secured against the guide slide 115 moving further outwards by means of a securing means (not illustrated in greater detail) which is integrated in a guide strip 120. The guide slide 115 is guided in the guide shaft 110 by means of a sliding-bearing guide, but alternatively could also be designed as a mounting on rolling bearings.

A characteristic feature of the guide slide 115 is its beveled section 125 in its upper end region, which section corresponds with a beveled section 130 of the receiving housing 20. For the setting of the inclination of the tabletop arrangement 25 in accordance with arrow C, a bearing 135 having a pivot axis 140 is provided about which a circular-segment-like holding plate 145 can be pivoted. The highest position which can be reached in the process is illustrated by solid lines, while the lowest position is indicated in turn by dash-dotted lines. In order to fix the holding plate 145 in its lowermost position, a lug 150 is provided on the outside of the holding plate 145 and then rests on the guide slide 115. Within the pivoting region of the tabletop arrangement 25 according to the arrow direction C, any desired pivoting position can be set in a fixed manner. This infinitely variable pivoting setting could, for example, take place by frictional engagement via a fixing device.

The tabletop arrangement 25 comprises two partial tabletops 146 and 147 which are identical in their dimensions and are connected to each other in a manner such that they can fold about an axis 151 via two hinges 148 and 149 on their long narrow side. The dimensions of each partial tabletop 146 and 147 are selected in such a manner that they do not exceed the dimensions of the guide shaft 110. The identical dimensions of the partial tabletops 146 and 147 enable the partial tabletop 146 to fold congruently on to the partial tabletop 147, and vice versa, in accordance with arrow D.

Fastened to the upper edge side 153 of the holding plate 145 are two hinges 155 and 156 on which the tabletop arrangement 25 is articulated and which enable a pivoting movement of the tabletop arrangement 25 about a pivot axis 160 in accordance with the arrow E. If, therefore, the two partial tabletops 146 and 147 are folded one onto the other, the tabletop arrangement 25 can therefore be pivoted from its horizontal in-use position (illustrated by solid lines) into a vertical intermediate position (indicated by dash-dotted lines) and subsequently lowered in the receiving housing together with the guide slide 115. In order to prevent the tabletop arrangement 25 from tipping beyond the intermediate position, a stopper 163 is mounted on the upper edge side 153.

Figure 3:
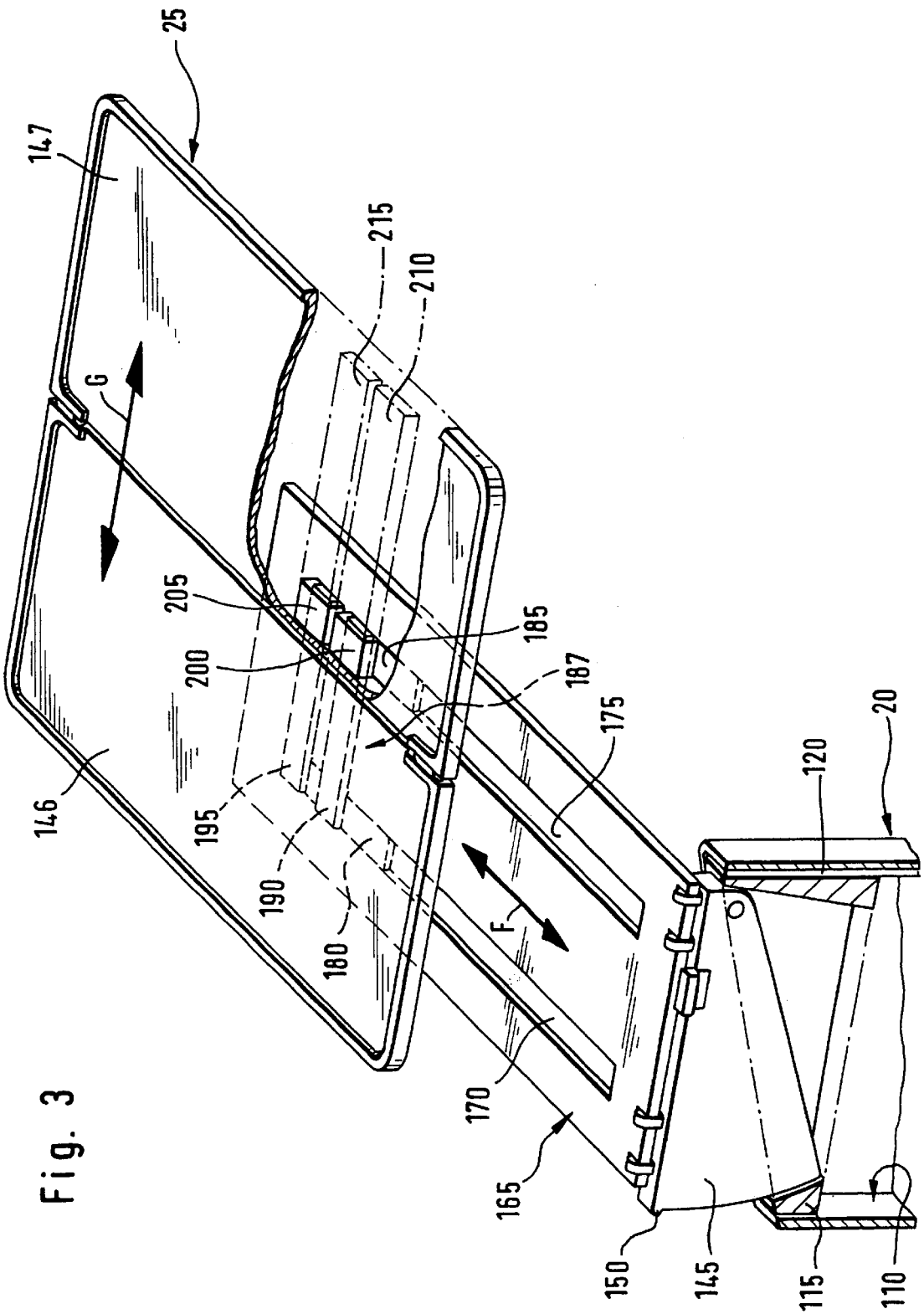
FIG. 3 shows the tabletop arrangement according to FIG. 2 in a displaced in-use position.

A further individual setting of the folding-table arrangement 10 is explained in greater detail with reference to FIG. 3. In order to permit various positions of the tabletop arrangement 25 with regard to its position with respect to the seat and with respect to the user, the partial tabletops 146 and 147 are mounted on a supporting plate 165 in a manner enabling them to be displaced longitudinally and transversely to the supporting plate 165 in the horizontal in-use position. In order to show this better, the partial tabletop 147 is illustrated broken open.

The supporting plate 165 has two guide slots 170 and 175 in which in each case two sliding blocks 180 and 185 of a slide 187 are guided to and fro in accordance with arrow F. The sliding blocks 180 and 185 are connected to each other by two profiles 190 and 195 arranged between the supporting plate 165 and the partial tabletops 146 and 147. One sliding piece 200 or 205 is fastened on each profile 190 and 195.

The sliding pieces 200 and 205 engage in guide grooves 210 and 215, respectively, which are arranged transversely to the guide slots 170 and 175 of the supporting plate 165 on the lower side of the partial tabletop 147. The partial tabletops 146 and 147, which are connected to each other, can therefore be moved to and fro along the arrow G. With the interaction of the two movements of the partial tabletops 146 and 147 in accordance with arrows F and G, a multiplicity of positions of the tabletop arrangement 25 on a plane running parallel to the supporting plate 165 can be set. Correspondingly necessary fixing of the partial tabletops 146 and 147 in their desired position can take place in the guides via frictional engagement, for example.

Figure 4:
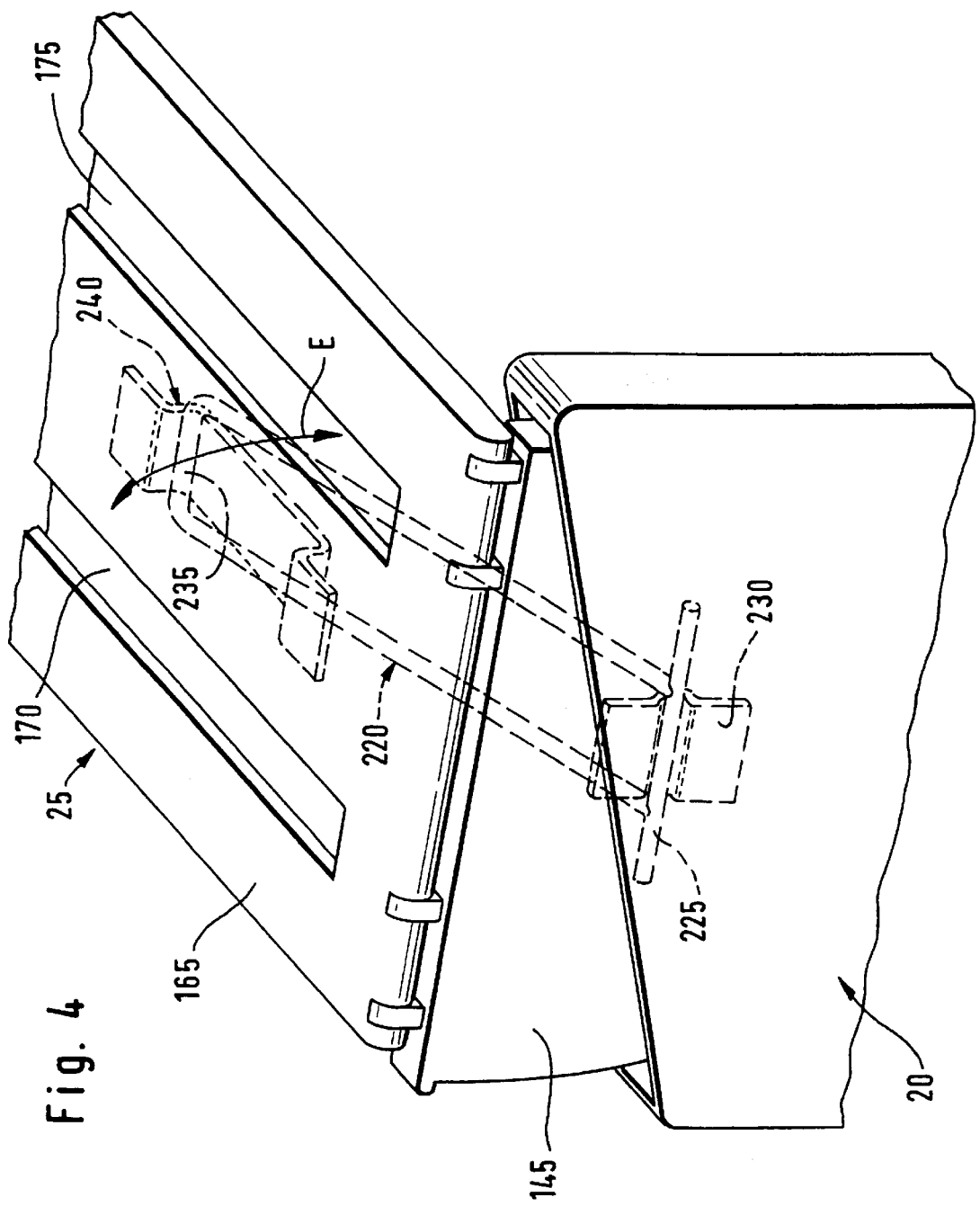
FIG. 4 shows the support of a supporting plate of the tabletop arrangement according to FIG. 3.

As can be seen from FIG. 4, a holding bracket 220 which is articulated on the holding plate 145 is provided in order to support the tabletop arrangement 25 in its horizontal in-use position. For this purpose, a web 225 of the holding bracket 220 is fastened to the holding plate 145 by a clip 230. That end 235 of the holding bracket 220 which is opposite the web 225 is held by a stop 240 which is fixed on the lower side of the supporting plate 165. At the same time, the stop 240 makes possible the rotational and longitudinal movement of the holding bracket 220 with respect to the tabletop arrangement 25, which movement is required for the pivoting movement of the tabletop arrangement 25 in accordance with arrow E.

Figure 5:
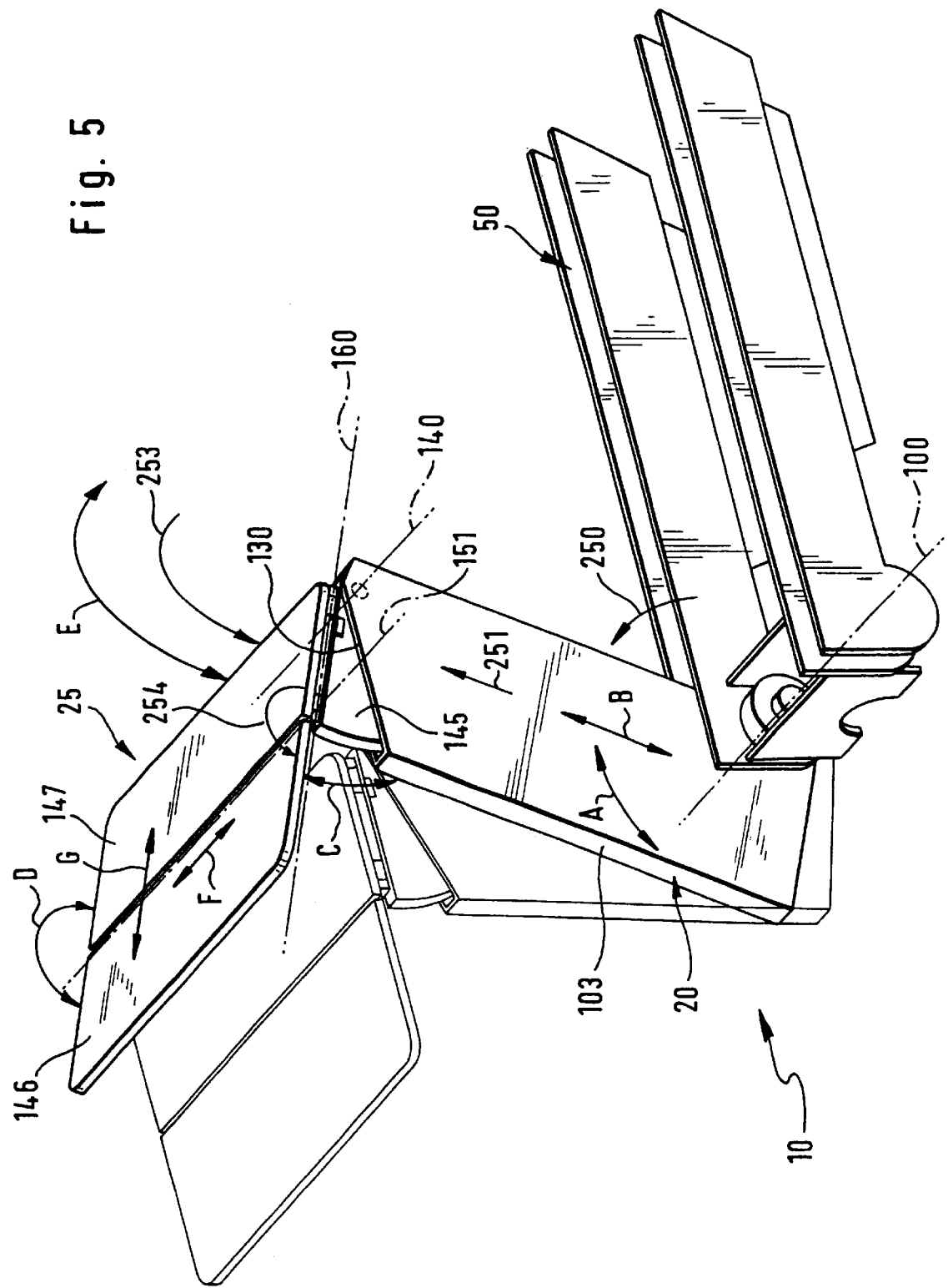
FIG. 5 shows a general illustration of the folding-table arrangement in two in-use positions.

In the following, the sequence of movement of the folding table arrangement 10 will be clarified again in FIG. 5.

In the storage position of the receiving housing 20 in the case 50, where the front narrow side 103 is used as a place to put an arm on, the receiving housing 20 on the partial tabletops 146 and 147, which protrude via the beveled section 130 of the receiving housing 20 and are folded one onto the other, can simply be grasped by the user and swung upwards about the pivot axis 100 in the arrow direction 250 into the position illustrated by solid lines. After that, the user pulls the partial tabletops 146 and 147, which are situated in the receiving housing 20, upwards out of the receiving housing in the arrow direction 251 until the guide slide 115, which is articulated on the partial tabletops 146 and 147, reaches its upper end position. In the upper end position of the guide slide 115, the pivot axis 160, at which the tabletop arrangement 25 is articulated on the guide slide 115, is no longer blocked by the guide shaft 110 of the receiving housing 20 with the result that the tabletop arrangement 25 can be folded downwards from its vertical intermediate position into its horizontal in-use position in accordance with arrow 253. The partial tabletop 146, which is resting on the partial tabletop 147, can now be folded open about the axis 151 in accordance with arrow 254, thereby making available a sufficiently large working surface for the user.

Depending on the user's build, he is able to set the partial tabletops 146 and 147 such that they are inclined to a greater or lesser extent towards him and are close to or away from him. For this purpose, the partial tabletops 146 and 147 can be displaced to and fro on the supporting plate 165 in accordance with the arrows F and G, so that any desired position can be set within a plane determined by the size of the supporting plate 165 and of the partial tabletop 147. The pivotable mounting of the tabletop arrangement 25 about the pivot axis 140 makes possible the setting of the inclination corresponding to the arrow C. In this case, it is definitely helpful for the user that the pivoting position about the pivot axis 100 corresponding to the arrow A to the setting of the inclination corresponding to the arrow C can be matched to the user's requirements. This is intended to be clarified by way of example by the thin-lined arrangement in FIG. 5.

If the user no longer requires the tabletop arrangement 25, the partial tabletop 147 has first of all to be pushed into its initial position on the supporting plate 165. After that, the partial tabletop 146 is folded onto the partial tabletop 147 in the reverse arrow direction 254. The tabletop arrangement 25 is then folded upward about the pivot axis 160 from its horizontal in-use position into its vertical intermediate position counter to the arrow direction 253, with the result that the guide slide 115 together with the tabletop arrangement 25 slides downwards virtually automatically into the receiving housing 20 counter to the arrow direction 251. The receiving housing 20 can now be folded downwards counter to the arrow direction 250 into the storage position in the case 50 and used again as a place to put an arm on.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A motor vehicle assembly comprising:
   a vehicle seat,
   a receiving housing disposed adjacent the vehicle seat and exhibiting a guide shaft,
   a tabletop arrangement including at least one tabletop member,
   a guide slide which is slidably movable in the guide shaft, and a hinge pin connected with the guide slide and operable to pivotally support the tabletop arrangement, wherein the guide slide together with the tabletop arrangement is movable between a lower stowage position inside the guide shaft with the tabletop arrangement extending substantially vertically and an upper in-use position facilitating pivoting of the tabletop arrangement at the hinge pin to an approximately horizontal in-use position in front of a passenger in the vehicle seat, and wherein the receiving housing can be folded downwards about a pivot axis running transversely to a wide side into a lowered storage position.

2. A motor vehicle assembly according to claim 1, wherein a narrow side of the receiving housing, which said narrow side faces upwards when the receiving housing is folded downwards, can be used as an armrest.

3. A motor vehicle assembly according to claim 2, wherein pivoting positions of the receiving housing can be fixed in a designated setting region.

4. A motor vehicle assembly comprising:

a vehicle seat, a receiving housing disposed adjacent the vehicle seat and exhibiting a guide shaft, a tabletop arrangement including at least one tabletop member, a guide slide which is slidably movable in the guide shaft, and a hinge pin connected with the guide slide and operable to pivotally support the tabletop arrangement, wherein the guide slide together with the tabletop arrangement is movable between a lower stowage position inside the guide shaft with the tabletop arrangement extending substantially vertically and an upper in-use position facilitating pivoting of the tabletop arrangement at the hinge pin to an approximately horizontal in-use position in front of a passenger in the vehicle seat, and wherein a holding bracket is provided as a support, which said bracket is articulated to the guide slide and, in the in-use position, is supported on a stop of the tabletop arrangement.

5. Folding-table arrangement for motor vehicles, which arrangement is assigned to a vehicle seat, with a tabletop arrangement comprising at least one tabletop being accommodated in a receiving housing which is arranged laterally next to the vehicle seat and from which each said tabletop of the tabletop arrangement can be pulled out upwards and folded down into an approximately horizontal in-use position in which the tabletop arrangement is held by the receiving housing by a support, in which case the tabletop arrangement together with a hinge pin axle, which connects the table top arrangement to the receiving housing, is guided in a sliding manner between a pulled-out and a pushed-in position in a guide shaft of the receiving housing, wherein the hinge pin axle of the tabletop arrangement is fixed on a guide slide which is guidably movable in the guide shaft of the receiving housing and, in the in-use position of the tabletop arrangement, is displaced into an upper end position in the guide shaft, and wherein a holding bracket is provided as a support, which said bracket is articulated to the guide slide and, in the in-use position, is supported on a stop of the tabletop arrangement.

6. Folding-table arrangement for motor vehicles, which arrangement is assigned to a vehicle seat, with a tabletop arrangement comprising at least one tabletop being accommodated in a receiving housing which is arranged laterally next to the vehicle seat and from which each said tabletop of the tabletop arrangement can be pulled out upwards and folded down into an approximately horizontal in-use position in which the tabletop arrangement is held by the receiving housing by a support, in which case the tabletop arrangement together with a hinge pin axle, which connects the table top arrangement to the receiving housing, is guided in a sliding manner between a pulled-out and a pushed-in position in a guide shaft of the receiving housing, wherein the hinge pin axle of the tabletop arrangement is fixed on a guide slide which is guidably movable in the guide shaft of the receiving housing and, in the in-use position of the tabletop arrangement, is displaced into an upper end position in the guide shaft, and wherein the tabletop arrangement can be adjustably set in inclination in the in-use position.

7. Folding-table arrangement according to claim 6, wherein for setting of the inclination, an approximately segment-shaped holding plate is mounted pivotably on the guide slide and pivoting positions can be fixed over a designated setting region, in which case the supporting plate is articulated on an upper edge side of the holding plate.

8. Folding-table arrangement according to claim 7, wherein an upper end region of the receiving housing is baffled adapting the receiving housing to a possible inclination of the holding plate.

9. Folding-table arrangement for motor vehicles, which arrangement is assigned to a vehicle seat, with a tabletop arrangement comprising at least one tabletop being accommodated in a receiving housing which is arranged laterally next to the vehicle seat and from which each said tabletop of the tabletop arrangement can be pulled out upwards and folded down into an approximately horizontal in-use position in which the tabletop arrangement is held by the receiving housing by a support, in which case the tabletop arrangement together with a hinge pin axle, which connects the table top arrangement to the receiving housing, is guided in a sliding manner between a pulled-out and a pushed-in position in a guide shaft of the receiving housing, wherein the hinge pin axle of the tabletop arrangement is fixed on a guide slide which is guidably movable in the guide shaft of the receiving housing and, in the in-use position of the tabletop arrangement, is displaced into an upper end position in the guide shaft, and wherein the tabletop arrangement is articulated on the guide slide via a supporting plate on which each said tabletop of the tabletop arrangement is mounted displaceably in a plane approximately parallel to the supporting plate.

10. Folding-table arrangement according to claim 9, wherein the tabletop arrangement is mounted on the supporting plate via a slide in a manner enabling the tabletop arrangement to be displaced in a longitudinal direction of the supporting plate, and a further sliding guide is provided transversely to said supporting plate.

11. Folding-table arrangement according to 10, wherein the tabletop arrangement comprises a two-part tabletop with elongate partial tabletops substantially the same size and connected to each other in an articulated manner along long narrow sides, as a result of which one of said partial tabletops can be folded onto the other in a space-saving manner prior to being slid into the guide shaft.

12. Folding-table arrangement for motor vehicles, which arrangement is assigned to a vehicle seat, with a tabletop arrangement comprising at least one tabletop being accommodated in a receiving housing which is arranged laterally next to the vehicle seat and from which each said tabletop of the tabletop arrangement can be pulled out upwards and folded down into an approximately horizontal in-use position in which the tabletop arrangement is held by the receiving housing by a support, in which case the tabletop arrangement together with a hinge pin axle, which connects the table top arrangement to the receiving housing, is guided in a sliding manner between a pulled-out and a pushed-in position in a guide shaft of the receiving housing, wherein the hinge pin axle of the tabletop arrangement is fixed on a guide slide which is guidably movable in the guide shaft of the receiving housing and, in the in-use position of the tabletop arrangement, is displaced into an upper end position in the guide shaft, and wherein the receiving housing can be folded downwards about a pivot axis running transversely to a wide side into a lowered storage position.

13. Folding-table arrangement according to claim 12, wherein a narrow side of the receiving housing, which said narrow side faces upwards when the receiving housing is folded downwards, can be used as an armrest.

14. Folding-table arrangement according to claim 13, wherein pivoting positions of the receiving housing can be fixed in a designated setting region.

15. A motor vehicle assembly comprising:

a vehicle seat, a receiving housing disposed adjacent the vehicle seat and exhibiting a guide shaft, a tabletop arrangement including at least one tabletop member, a guide slide which is slidably movable in the guide shaft, and a hinge pin connected with the guide slide and operable to pivotally support the tabletop arrangement, wherein the guide slide together with the tabletop arrangement is movable between a lower stowage position inside the guide shaft with the tabletop arrangement extending substantially vertically and an upper in-use position facilitating pivoting of the tabletop arrangement at the hinge pin to an approximately horizontal in-use position in front of a passenger in the vehicle seat, wherein the tabletop arrangement includes a plurality of tabletop members pivotally connected along mutually facing edges, and wherein the tabletop arrangement is articulated on the guide slide via a supporting plate on which each said tabletop member of the tabletop arrangement is mounted displaceably in a plane approximately parallel to the supporting plate.

16. A motor vehicle assembly according to claim 15, wherein the tabletop arrangement is mounted on the supporting plate via a slide in a manner enabling the tabletop arrangement to be displaced in a longitudinal direction of the supporting plate, and a further sliding guide is provided transversely to said supporting plate.

17. A motor vehicle assembly according to claim 16, wherein the tabletop members are substantially the same size and can be selectively unfolded to an in-use horizontal side by side position and folded to a stowage position accommodating stowage in the guide shaft.

18. A motor vehicle assembly comprising:

a vehicle seat, a receiving housing disposed adjacent the vehicle seat and exhibiting a guide shaft, a tabletop arrangement including at least one tabletop member, a guide slide which is slidably movable in the guide shaft, and a hinge pin connected with the guide slide and operable to pivotally support the tabletop arrangement, wherein the guide slide together with the tabletop arrangement is movable between a lower stowage position inside the guide shaft with the tabletop arrangement extending substantially vertically and an upper in-use position facilitating pivoting of the tabletop arrangement at the hinge pin to an approximately horizontal in-use position in front of a passenger in the vehicle seat, and wherein the tabletop arrangement can be adjustably set in inclination in the in-use position.

19. A motor vehicle assembly according to claim 18, wherein for setting of the inclination, a segment-shaped holding plate is mounted pivotably on the guide slide and pivoting positions can be fixed over a designated setting region, in which case the supporting plate is articulated on an upper edge side of the holding plate.

20. A motor vehicle assembly according to claim 19, wherein an upper end region of the receiving housing is baffled adapting the receiving housing to a possible inclination of the holding plate.

* * * * *